United States Patent Office 3,381,034
Patented Apr. 30, 1968

3,381,034
PROCESS FOR HYDROLYZING NITRILES
Janice L. Greene, Warrensville Heights, and Murrel Godfrey, Cleveland, Ohio, assignors to The Standard Oil Company, Cleveland, Ohio, a corporation of Ohio
No Drawing. Filed June 30, 1965, Ser. No. 468,546
14 Claims. (Cl. 260—557)

ABSTRACT OF THE DISCLOSURE

Nitriles of the formula $R{-}(CN)_x$ are hydrolyzed with water in the presence of soluble copper ions in the pH range of 1 to 12.5.

---

The present invention relates to a novel process for hydrolysis of nitriles with water and a copper catalyst and more particularly pertains to the formation of amides, acids and other hydrolysis products from nitriles by hydrolysis with water in the presence of copper ions.

The hydrolysis of nitriles to form the corresponding amides, acids and other hydrolysis products in the presence of acids and bases is well known to those skilled in the art. The hydrolysis of nitriles by the use of mineral acids such as strong sulfuric acid is well known and the usual procedure in working up the amide product is to neutralize the sulfuric acid with a base and then to separate the sulfate salt from the amide product by some means. In a commercial hydrolysis of this type, it is often useful to use ammonia to neutralize the sulfuric acid and then to use the ammonium sulfate or ammonium hydrogen sulfate as a fertilizer component because the regeneration of sulfuric acid for recycling is too costly. The separation of the ammonium sulfate from the amide product is not always simple, particularly in the case in which the amide product is water soluble.

The solubility of copper halides in acetonitrile has been studied (Ber. 47, 247–256, 1914) and copper powder has been used as a polymerization inhibitor in the sulfuric acid hydrolysis of nitriles such as acrylonitrile.

The present process is a novel catalytic process which involves the hydrolysis of nitriles with water in the presence of a copper salt which may also contain metallic copper. The hydrolysis products of the present process are relatively pure and are easily recovered without any appreciable amounts of by-products.

The nitriles useful in the present invention are those having the structure $R{-}(CN)_x$ wherein R is a hydrocarbon group having from 1 to 10 carbon atoms and $x$ is a number of from 1 to 4. More preferred are nitriles of the foregoing structure wherein R is a member selected from the group consisting of an aromatic hydrocarbon radical, an alkyl radical, an alicyclic radical and an olefinic radical having from 1 to 8 carbon atoms and $x$ is a number from 1 to 2. Specific preferred nitriles useful in the present invention include acetonitrile, propionitrile, butyronitrile, acrylonitrile, methacrylonitrile, crotononitrile, maleic dinitrile, glutaronitrile, succinonitrile, adiponitrile, cyclobutane-1,2-dicyanide, benzonitrile, and the like, and others.

The catalyst operative in the instant invention comprises cupric ions, preferably in combination with metallic copper and cuprous ions. The cuprous ion itself is believed to be sufficient for the purpose of this invention because of the following disproportionation reaction (according to Cotton and Wilkinson, "Advanced Inorganic Chemistry," Interscience, New York, 1962, page 749) which occurs in aqueous medium:

$$2Cu^+ \rightleftharpoons Cu^\circ + Cu^{++}$$

Thus, it is only necessary to have present as catalyst initially cuprous salts alone or a combination of metallic copper and a water soluble cupric salt in the instant process. It is also contemplated that combinations of metallic copper and cuprous salts, cuprous salts and cupric salts as well as metallic copper, cuprous salts and cupric salts can be used to advantage in the instant process. Stated differently, suitable catalytic combinations include $Cu^\circ + Cu^+$, $Cu^\circ + Cu^{++}$, $Cu^+ + Cu^{++}$ and $Cu^\circ + Cu^+ + Cu^{++}$, etc. We have found that metallic copper when used alone is ineffective in this process.

Bearing in mind the foregoing, any cupric or cuprous salt may be used so long as it is at least slightly soluble in water, the nitrile, or both water and the nitrile. Thus, although CuCl, CuI and CuCN are practically insoluble in water (Gmelin "Handbuch der Anorganischen Chemie," vol. 60, pages 406 and 854) they can still catalyze the hydrolysis of nitriles to amides.

The copper ions which catalyze this reaction may be coordinated with water and other ligands known to form complexes with copper ions such as ethylene, carbon monoxide, chloride ions, ammonia, amines, and unsaturated nitriles, etc., without destroying their catalytic activity.

Although copper salts in aqueous solution are acidic (Moeller, "Qualitative Analysis," pages 103–4, 1958) the catalysis of nitrile hydrolysis by copper salts is not a function of acidity alone because we have been unable to detect the formation of nitrile hydrolysis products at a pH of 3 in the absence of copper ions. In the presence of the catalysts embodied herein, nitriles can be hydrolyzed within the pH range of from about 1 to about 12.5.

The amount of copper ion catalyst useful in the present invention falls within rather broad ranges. The amount of catalyst used appears to have little or no effect on the conversion of nitrile to hydrolysis products. At the lower catalyst levels, however, the reaction times required for significant hydrolysis may be quite long. The upper end of the range of copper ion catalyst will depend upon convenience and reactor design. The use of a fluidized bed of a solid copper ion catalyst with or without a carrier and the contacting of this fluidized catalyst bed with the nitrile and water vapor at an elevated temperature is contemplated in the present invention.

The role of copper metal in the catalyst is not clearly understood at the present time, although its presence appears to facilitate the desired reaction. It is possible that this beneficial effect is attained by stabilization of the cuprous ion state through partial reversal of the equilibrium shown above. No pretreatment of the metallic copper is necessary, although it is recommended that surface dirt, etc., be removed with a solvent such as chloroform prior to use of the copper metal as a catalyst component in the instant process. Coating of the copper surface with mercury is undesirable. The physical state of the metallic copper is not critical in the instant process. The copper metal may be present in any convenient form such as wire, turnings, powder, etc. The amount of copper metal present in the catalyst is not critical although for convenience and economy it is preferred that there be present from about 0.5 to 1.0 mole of copper metal per mole of copper ion or ions.

The present process can be conducted under a rather wide range of temperatures, but the desired reaction may be quite slow at the low temperatures. The hydrolysis temperature can be varied from about 25° C. to 220° C. and the preferred range is from about 100 to about 150° C.

The reaction pressure in the instant process is not critical and can range from atmospheric and below up to about 2000 p.s.i.g. and higher. For the nitriles which are volatile the use of elevated pressures is advantageous in that more of the nitrile is kept in the liquid phase during the reaction.

The relative amounts of water and nitrile can be varied considerably. Less than stoichiometric amounts of water can be employed if desired, depending upon convenience and reactor design, but stoichiometric quantities are required for complete reaction. The stoichiometry of the process is shown in the following equations employing for convenience an illustrative nitrile $R(CN)_x$ of the foregoing type wherein $x$ is 1:

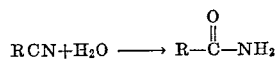

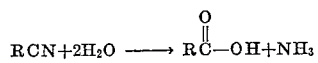

Thus, it is preferred in the present process that at least one mole of water be used per chemical equivalent of cyanide present in the nitrile.

Other solvents in addition to the water and $R(CN)_x$ reactants may be employed in the instant process if desired. Suitable auxiliary solvents include dioxane, dimethoxyethane, acetone, tetrahydrofuran, the dimethyl ether of diethylene glycol, chloroform, pyridine and the like.

The primary hydrolysis products of the present process are the amide and the carboxylic acid. In the preparation of the amide some of the acid is usually produced as a by-product. In addition to the acid, small amounts of some other by-products are produced in the instant process. Other by-products which have been found include carboxylic acid esters when alcohol is present in the reaction medium, and in the case of the hydrolysis of an alpha, beta-olefinically unsaturated nitrile such as acrylonitrile the by-products $HOCH_2CH_2CN$ and $$O(CH_2CH_2CN)_2$$

have been found to be present in small amounts.

In the following examples which will illustrate the process of this invention the amounts of ingredients are expressed in moles unless otherwise indicated; conversions are expressed in mole percent.

EXAMPLE I

The nitrile, water and catalyst were placed in a reaction vessel equipped with heating means, stirrer and cooling means. The vessel was then pressured with nitrogen to about 50 p.s.i.g. followed by venting and repressuring with nitrogen until substantially all of the air had been removed. After the final venting, the vessel was sealed and heated to the reaction temperature with continuous stirring. Samples of the reaction mixture were removed from time to time and were subjected to vapor chromatographic analysis and infrared analysis. When the desired conversion level had been reached in the reaction, the mixture was cooled and the hydrolysis product was separated from the unreacted nitrile, the catalyst and other products by suitable means which may include distillation, crystallization, extraction, ion exchange, etc.

In a representative experiment, the foregoing procedure was employed using the nitriles given in Table I at a temperature of 125° C., under autogenous pressure employing a charge of 150 ml. of water, 150 ml. of nitrile, 10 grams of copper (when used) and 15 grams of the copper salt (when used). The conversions of amide given in Table I are expressed in mole % based on the nitrile.

TABLE I

| Nitrile | Catalyst | Reaction Time (hours) | Percent Conversion of Nitrile to Amide |
|---|---|---|---|
| Acrylonitrile | $CuCl_2$ | 8 | 4.2 |
| Acetonitrile | $CuCl_2$ | [1] 18 | 8.65 |
| Succinonitrile | $CuCl_2$ | [1] 20 | 52 |
| Acrylonitrile | CuCl | 7 | 4 |
| Do | $CuCl_2$+CuCl | 10 | 0.5 |
| Do [2] | $CuCl_2$+Cu | 13 | 65.3 |
| Do | $CuCl_2$+Cu | 4 | 37 |
| Do | CuCl+Cu | 8 | 22 |
| Do | Cu | 13 | None |
| Do | $CuSO_4$+Cu | 8 | 12.3 |
| Do | CuI | 8 | 0.5 |
| Do | CuCN+Cu | 21 | 0.5 |
| Do | $CuCl \cdot CH_2=CHCN$ [3] | 8 | 9.8 |
| Do | $CuCl \cdot CH_2=CHCN$+Cu [3] | 8 | 12.7 |
| Do [4] | $CuCl$+Cu+$CH_2=CH_2$ [5] | 4 | 23.4 |
| Do | CuCl+Cu+Co [6] | 4 | 18.4 |
| Do | CuCl+Cu+NaCl (5 moles NaCl per mole of CuCl) | 18 | 22 |

[1] 200° C.
[2] In this experiment 5.8 mole percent of acrylic acid, 12 mole percent of hydracrylonitrile, 8.8 mole percent of acrylonitrile and 8.1% of water soluble polymer were also recovered.
[3] Prepared as in Ber. 94, 1893 (1961).
[4] In this experiment 9.9 mole percent acrylic acid, 16.7 mole percent hydracrylic acid and 52.3 mole percent acrylonitrile were also recovered.
[5] 900 p.s.i.g.
[6] 800 p.s.i.g.

EXAMPLE II

The procedure of Example I was repeated and the pH of the reaction medium was varied. The nitrile used was acrylonitrile and the results of several experiments are given in Table II.

TABLE II

| Catalyst | pH | Reaction Time (hours) | Percent Conversion to Acrylamide |
|---|---|---|---|
| CuCl+Cu+0.1 N HCl | 1.2 | 6 | 10 |
| CuCl+Cu+Acetic Acid | 1.5 | 5 | 9.6 |
| CuCl+Cu+Acetic Acid+Sodium Acetate | 5.2 | 4 | 15.7 |
| $CuCl_2$+Cu+Pyridine | 7.6 | 6 | 11.6 |
| $CuCl_2$+Cu+$NH_4OH$ [1] | 12.5 | 21 | 0.5 |
| Only 0.001 N HCl | 3.1 | 27 | None |

[1] The starting nitrile was acetonitrile.

EXAMPLE III

The procedure of Example I was repeated testing the effect of variation of the mole ratio of copper ion to nitrile wherein the nitrile was acrylonitrile. The results of several experiments are given in Table III.

TABLE III

| Mole Ratio Copper Ion/Acrylonitrile | Reaction Time (hours) | Percent Conversion to Acrylamide |
|---|---|---|
| 0.016 | 11 | 24.4 |
| 0.067 | 8 | 22 |
| 0.188 | 8 | 30 |
| 1.0 | 13 | 43.6 |

EXAMPLE IV

The procedure of Example I was repeated testing the effect of pre-treatment of the copper metal used in the catalyst. The copper metal was copper turnings with one exception. The results are shown in Table IV.

TABLE IV

| Grams of Metallic Copper | Pre-Treatment of Copper | Reaction Time (hours) | Percent Conversion to Acrylamide |
|---|---|---|---|
| 10 | None | 6 | 17.2 |
| 40 | do | 6 | 13.0 |
| 10 [1] | do | 4 | 10.0 |
| 10 | Boiled in $CHCl_3$, 90 min | 4 | 15.0 |
| 10 | Boiled in conc. HCl, 90 min., washed with distilled $H_2O$ to pH 7. | 8 | 10.0 |
| 10 | Amalgamation with mercury. | 26 | None |

[1] Copper powder, >100 mesh.

EXAMPLE V

The procedure of Example I was followed employing acrylonitrile and a catalyst composed of 10 g. of copper metal and 15 g. of $CuCl_2$. The effect of reaction temperature was studied and the results are given in Table V.

TABLE V

| Reaction Temperature, °C. | Reaction Time (hours) | Percent Conversion to Acrylamide |
|---|---|---|
| 72 | 20 | 0.2 |
| 125 | 13 | 48 |
| 200 | 0.25 | (1) |

[1] Recovered only water-soluble polymer.

EXAMPLE VI

The procedure of Example I was followed and several solvents in addition to the nitrile and water were employed. The results of these experiments are given in Table VI.

TABLE VI

| Solvent | Reaction Time (hrs.) | Percent Conversion to Acrylamide |
|---|---|---|
| Methanol | 2 | 3.1 |
| Dioxane | 6 | 5.9 |
| Do [1] | 5 | 18.5 |
| Dimethoxyethane | 3 | 4.1 |
| Acetone | 3 | 4.1 |
| Chloroform | 4 | 12.5 |
| Pyridine | 6 | 11.6 |

[1] 800 p.s.i.g. at 125° C.

EXAMPLE VII

The procedure of Example I was followed using variations in the mole ratio of water to acrylonitrile and the results are given in Table VII.

TABLE VII

| Mole Ratio Water/Acrylonitrile | Reaction Time (hours) | Percent Conversion to Acrylamide |
|---|---|---|
| 1/1 | 6 | 11.4 |
| 2/1 | 6 | 16 |
| 3.7/1 | 6 | 14.1 |
| 20/1 | 5 | 17.0 |

EXAMPLE VIII

The procedure of Example I was followed using the various nitriles given in Table VIII.

TABLE VIII

| Nitrile | Reaction Time (hours) | Percent Conversion to Amide |
|---|---|---|
| Acrylonitrile | 13 | 65 |
| Acetonitrile | 13 | 16.7 |
| Methacrylonitrile | 21 | 7.8 |
| Do | [1] 22 | 12.4 |
| Crotononitrile | 45 | 22.6 |
| Succinonitrile | [2] 20 | 52 |
| Benzonitrile | [2] 20 | 20.5 |
| 1,2-Dicyanocyclobutane | [2] 20 | 2.3 |

[1] 21 hours at 125° C., 1 hour at 210° C.
[2] Reaction temperature 200° C.

In the Table VIII the reaction product from succinonitrile was succinamide as identified by infrared. In the case of benzonitrile, the reaction charge was 0.19 mole of nitrile, 2.78 moles of water, 0.041 mole of $CuCl_2$ and 0.063 mole of Cu. In the case of 1,2-dicyanocyclobutane the reaction charge was 0.47 mole of nitrile, 2.78 moles of water and 0.041 mole of $CuCl_2$. The product from the 1,2-dicyanocyclobutane was 1,2-cyclobutanedicarboxamide as identified by infrared spectroscopy.

We claim:

1. The process for hydrolyzing a nitrile having the strucutre $R(CN)_x$ wherein R is an alkyl radical having from 1 to 8 carbon atoms, an alicyclic radical having from 4 to 8 carbon atoms, an olefinic radical having from 2 to 8 carbon atoms or an aromatic hydrocarbon radical having from 6 to 10 carbon atoms and $x$ is a number from 1 to 4 comprising contacting said nitrile with water at a pH of from about 1 to about 12.5 in the presence of a copper ion, said copper ion being at least partially soluble in water, the nitrile or in both water and the nitrile and said copper ion being composed of copper in a combined valence state of $Cu°+Cu^+$, $Cu°+Cu^{++}$, $Cu^++Cu^{++}$, or $Cu°+Cu^++Cu^{++}$.

2. The process for hydrolyzing a nitrile selected from the group consisting of acetonitrile, propionitrile, butyronitrile, acrylonitrile, methacrylonitrile, crotononitrile, maleic dinitrile, glutaronitrile, succinonitrile, adiponitrile, cyclobutane-1,2-dicyanide and benzonitrile comprising contacting said nitrile with water at a pH of from about 1 to about 12.5 in the presence of a copper ion said copper ion being at least partially soluble in water, the nitrile or in both water and nitrile and said copper ion being composed of copper in a combined valence state of $Cu°+Cu^+$, $Cu°+Cu^{++}$, $Cu^++Cu^{++}$, or $$Cu°+Cu^++Cu^{++}$$

at a temperature of from about 25° C. to about 220° C. at from about atmospheric pressure up to about 2000 p.s.i.g.

3. The process of claim 2 wherein the temperature is from about 100° C. to about 150° C.

4. The process of claim 3 wherein the copper ion is a mixture of cuprous and cupric ions.

5. The process of claim 4 wherein there is also present from 0.5 to 1.0 mole of copper metal per mole of copper ions.

6. The process of claim 5 wherein there is employed at least one mole of water per chemical equivalent of cyanide present in the nitrile.

7. The process of claim 6 wherein the nitrile is acrylonitrile.

8. The process of claim 6 wherein the nitrile is acetonitrile.

9. The process of claim 6 wherein the nitrile is methacrylonitrile.

10. The process of claim 6 wherein the nitrile is crotononitrile.

11. The process of claim 6 wherein the nitrile is succinonitrile.

12. The process of claim 6 wherein the nitrile is benzonitrile.

13. The process of cltim 6 wherein the nitrile is 1,2-dicyanocyclobutane.

14. The process of claim 6 wherein the nitrile is adiponitrile.

References Cited

UNITED STATES PATENTS 3,062,883   11/1962   Gilbert et al. _____ 260—561

JOHN D. RANDOLPH, *Primary Examiner.*

WALTER A. MODANCE, *Examiner.*

H. I. MOATZ, *Assistant Examiner.*